United States Patent [19]

Smock

[11] 4,264,005
[45] Apr. 28, 1981

[54] POWERED ROLLER CONVEYOR WITH DRIVE DISENGAGING MEANS

[76] Inventor: William L. Smock, 5831 S. Meridian St., Indianapolis, Ind. 46217

[21] Appl. No.: 63,044

[22] Filed: Aug. 2, 1979

[51] Int. Cl.³ .................. B65G 13/071; B65G 13/075
[52] U.S. Cl. .................................................. 198/781
[58] Field of Search ............... 198/781, 789, 790, 791; 193/35 A, 35 SS

[56] References Cited

U.S. PATENT DOCUMENTS

| | | | |
|---|---|---|---|
| 1,900,150 | 3/1933 | Anderson | 193/35 A |
| 2,360,708 | 10/1944 | Muddiman | 193/35 A |
| 3,232,415 | 2/1966 | Gotham | 198/781 |
| 3,337,023 | 8/1967 | Kohl et al. | 198/787 |
| 3,563,721 | 2/1971 | Ritter | 198/781 X |
| 3,756,376 | 9/1973 | Kurger et al. | 198/783 |
| 4,006,815 | 2/1977 | Werntz | 198/781 |
| 4,096,942 | 6/1978 | Shepherd | 198/790 X |
| 4,174,777 | 11/1979 | Riehle | 198/781 |

*Primary Examiner*—James L. Rowland
*Attorney, Agent, or Firm*—Blanchard, Flynn, Thiel, Boutell & Tanis

[57] ABSTRACT

A powered roller conveyor wherein a plurality of conveyor rolls are formed as elongated sleeves and are freely rotatably supported on support shafts which are slightly undersized relative to the sleeves. At least some of the support shafts are rotatably driven. The conveyor incorporates at least one zone having a brake or lifting device disposed below the conveyor rolls and liftable upwardly a small amount to thereby engage the conveyor rolls to drivingly disengage same from the continuously driven support shafts to permit stoppage of the conveyor rolls and the articles supported thereon. This lifting device accomplishes stopping of selected conveyor rolls and articles while permitting continuous driving of the support shafts throughout the conveyor.

10 Claims, 7 Drawing Figures

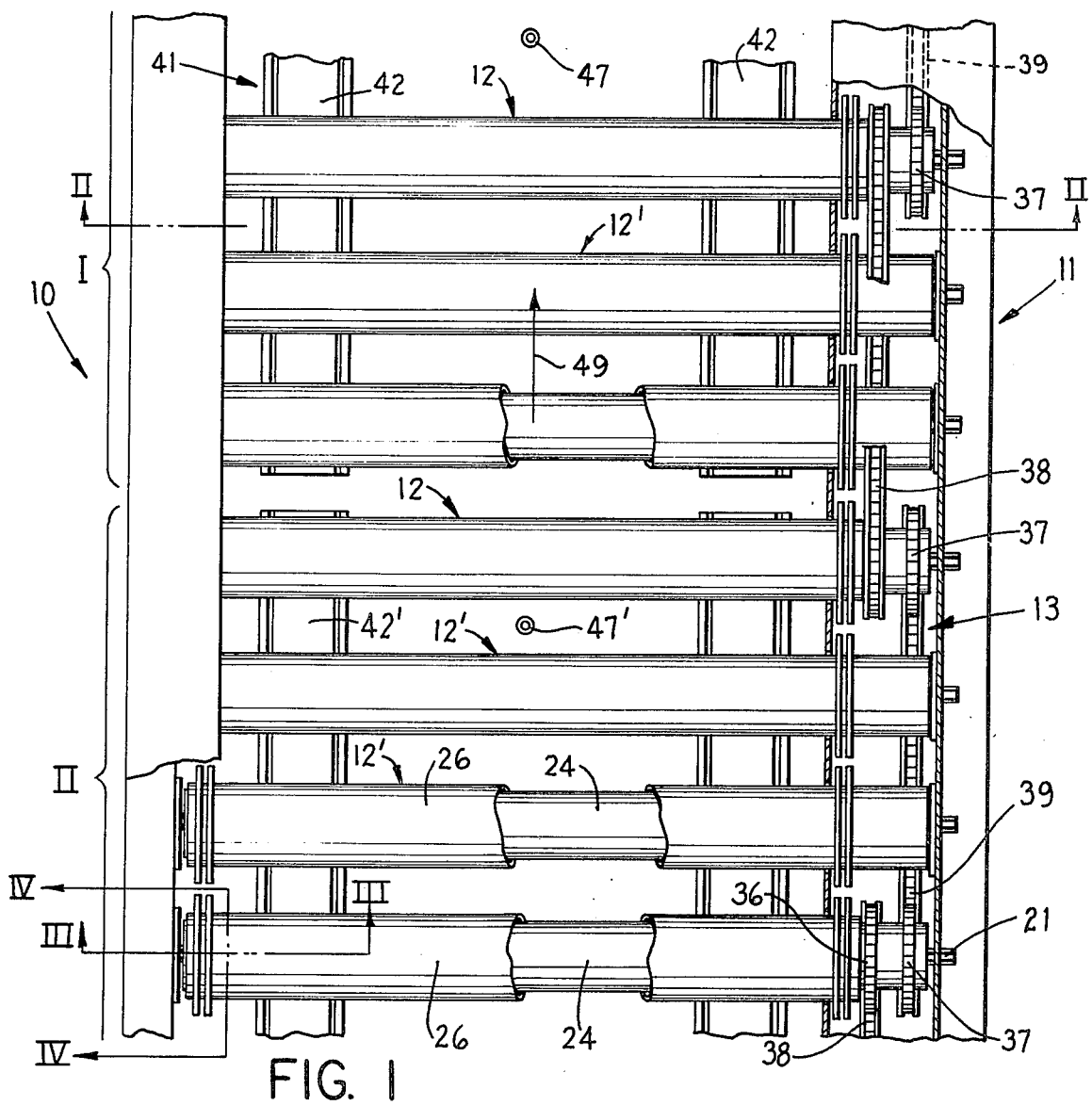
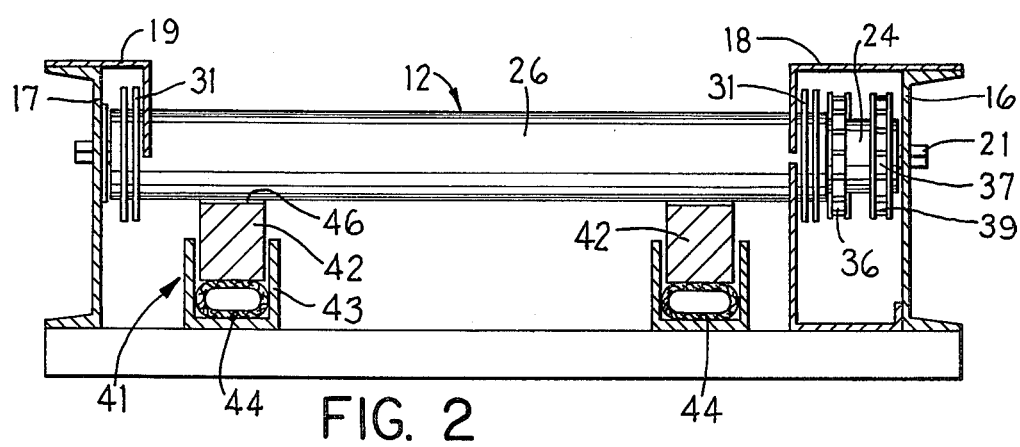

POWERED ROLLER CONVEYOR WITH DRIVE DISENGAGING MEANS

FIELD OF THE INVENTION

This invention relates to an improved powered roller conveyor for transporting heavy loads and, more specifically, to a zoned conveyor having individually controlled lifting devices associated with each zone for permitting article stoppage within a selected zone without requiring clutches or other disengaging drive structure associated with the main power transmission system.

BACKGROUND OF THE INVENTION

Powered roller conveyors are widely used in various manufacturing and transfer operations to permit goods to be transported to and between various locations, with the goods being handled on a "first in-first out" basis. One conventional conveyor as utilized with small or lightweight articles (i.e., less han 50 pounds) permits the articles to accumulate one after the other at the output end of the conveyor, with the accumulated articles abutting one another and slipping on the continuously driven conveyor rolls. This conveyor performs satisfactorily when dealing with articles of light weight since the driving force imposed on each article is hence of small magnitude, so that the line pressure which exists between adjacent articles and which accumulates along the row of accumulated articles remains rather small.

However, when dealing with heavy articles, particularly articles in excess of 500 or more pounds, such as engine blocks, then the driving force applied to each article is of much greater magnitude, and hence the accumulated line pressure which exists on and is exerted through the row of accumulated articles becomes of large magnitude. This is undesirable since it results in an excessive force being imposed on the stop located at the end of the conveyor, and hence severely restricts the number of articles which can be accumulated within a single row. For this reason, most powered roller conveyors when designed for use with heavier articles have necessarily involved the well-known and extensively utilized concept of "zoning." Such conveyor is divided longitudinally into a plurality of zones each having a preselected number of drive rolls associated therewith, and a suitable retractable stop is located at the discharge end of each zone. A control system involving switches and sensors is provided for interconnecting the various zones so that articles will be permitted to advance from one zone to the next only when the respective sensor indicates an opening in such zone. In this manner, the number of articles within each zone can be limited to a small number and hence the maximum accumulated line pressure can be limited to tolerable levels. Alternately, only a single article is accumulated within each zone so that zero line pressure exists along the conveyor between adjacent articles. These zoned conveyors, however, are necessarily complex both structurally and operationally due to the large number of zones required and the clutches and related control elements associated with each zone in order to disrupt the drive torque used for rotatably driving the rollers of each zone, and/or the provision of a separate drive for each zone, thereby making the conveyor expensive to construct and install, increasing the required maintenance, and requiring continuous and repetitive adjustmets of the system.

The present invention accordingly relates to an improved powered roller conveyor which can successfully transport, handle and stop heavy articles while resulting in the development of extremely small line pressure per article, specifically zero line pressure, whereby substantial numbers of such articles can be successfully handled and transported.

The improved conveyor of this invention, while providing zoning, nevertheless permits substantial simplification of the overall conveyor in contrast to prior systems in that it does not require special gear ratios or drives for creating a gap between articles when an article is advanced from one zone to the next, structurally and functionally complex drive disengaging devices such as clutches and the like associated with each zone for permitting disruption of the drive train, or separate drive motors and systems for each zone.

The improved roller conveyor of this invention successfully handles and transports heavy articles while permitting continuous and positive (i.e., nonslip) driving of the conveyor drive rollers or shafts. This conveyor is thus usable in situations wherein intermittent driving of the rollers or shafts was previously required, which intermittent driving required complex drive arrangements employing clutches and the like associated with each zone. In this invention, all of the support or drive shafts throughout the conveyor are positively and continuously driven by a single drive train from a single drive source, although selected conveyor rolls can be easily drivingly disengaged and stopped for zoning, or at a selected work station, while avoiding or minimizing the development of line pressure on the stopped articles.

In the improved conveyor of this invention, a plurality of conveyor rolls are formed as elongated sleeves and are freely rotatably supported on support shafts which are slightly undersized relative to the sleeves. At least selected support shafts at preselected intervals longitudinally along the conveyor are rotatably driven to thereby rotatably drive the conveyor rolls. The conveyor is provided with one or more zones, each having a plurality of conveyor rolls associated therewith. A lifting structure is associated with and extends longitudinally along the zone, being disposed below the conveyor rolls. Responsive to a signal, the lifting structure is moved upwardly a small distance, as by pressurization of an inflatable device, which lifting structure engages and slightly lifts the conveyor rolls sufficiently to effectively frictionally disengage them from the support shafts to thereby stop the roll rotation and hence stop the conveying of the article. This stoppage of the article occurs in a simple and efficient manner, while at the same time the support shafts associated with the zone are continuously and positively rotatably driven. All of the support shafts throughout all of the zones, and in fact throughout the complete conveyor, can be continuously and positively driven by a drive train of minimum structural and mechanical complexity, thereby permitting economical and dependable conveyor operation, even when handling extremely heavy loads.

Accordingly, it is an object of this invention to provide an improved conveyor with one or more article-stoppage zones, with each zone having an individual drive disengaging device associated therewith which permits limited lifting of the conveyor rolls from the support shafts to effectively disengage and hence stop the conveyor rolls and the article supported thereon. At the same time, the drive rollers or shafts as associated with the remainder of the conveyor can be continuously and positively driven at all times so that a greatly simplified and yet positive driving of the individual support shafts is possible.

SUMMARY OF THE INVENTION

In the improved conveyor of this invention, the conveyor rolls are formed as elongated sleeves, with one such sleeve being rotatably and surroundingly supported on a support shaft. Each sleeve is of slightly larger diameter than the support shaft so as to be eccentrically supported thereon, each sleeve thus has the inner surface thereof frictionally drivingly engaged with the upper outer surface of the support shaft along a substantially line contact.

In this conveyor, there is preferably provided several longitudinally spaced zones each having a plurality of conveyor rolls associated therewith. A lifting device is associated with each zone and is selectively actuatable for causing slight upward lifting of the conveyor rolls relative to the support shafts to thereby drivingly disengage the conveyor rolls from the continuously driven support shafts. The lifting device, in a preferred embodiment, comprises an elongated lifting member which extends transversely beneath the conveyor rolls and can be vertically raised to engage and hence slightly lift the conveyor rolls, and the article thereon, out of driving engagement with the support shafts.

BRIEF DESCRIPTION OF THE DRAWINGS

FIG. 1 is a fragmentary top view, partially in cross section, of an improved powered roller conveyor according to the present invention.

FIGS. 2, 3 and 4 are sectional elevational views taken along lines II—II, III—III and IV—IV respectively, in FIG. 1.

Figure 3:
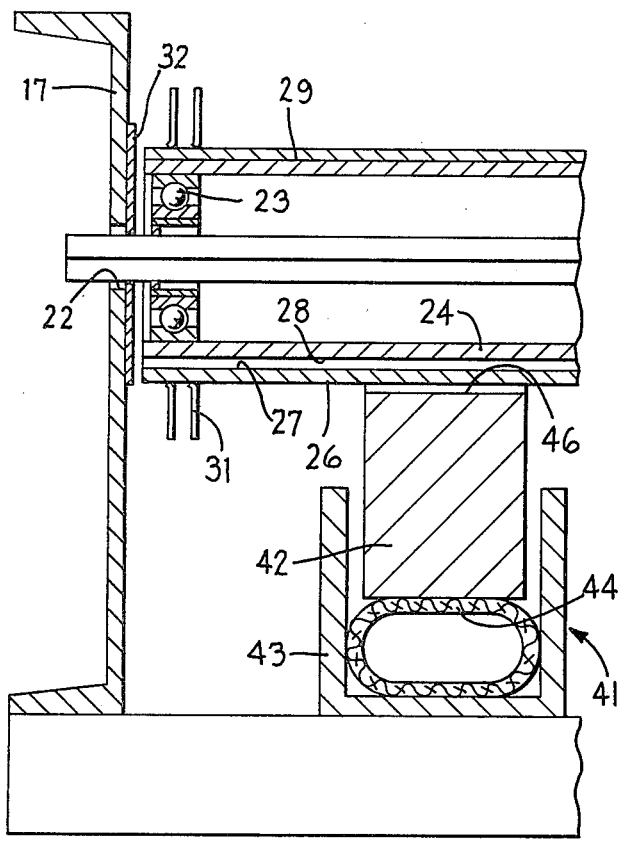

Certain terminology will be used in the following description for convenience in reference only and will not be limiting. For example, the words "upwardly," "downwardly," "rightwardly" and "leftwardly" will refer to directions in the drawings to which reference is made; "inwardly" and "outwardly" will refer to directions toward and away from, respectively, the geometric center of the conveyor and designated parts thereof; and "forwardly" will refer to the normal movement direction of articles along the conveyor, which direction is upwardly in FIG. 1. Said terminology includes the words specifically mentioned, derivatives thereof, and words of similar import.

DETAILED DESCRIPTION

FIG. 1 illustrates a powered roller conveyor 10 according to the present invention, which conveyor includes a frame 11 having a plurality of roller units 12 supported thereon, which units are driven by a drive system 13.

The frame 11 includes opposed side rails 16 and 17 which extend longitudinally of the conveyor and are respectively provided with cover plates 18 and 19 for at least partially enclosing the ends of the roller units and the drive system.

Figure 4:
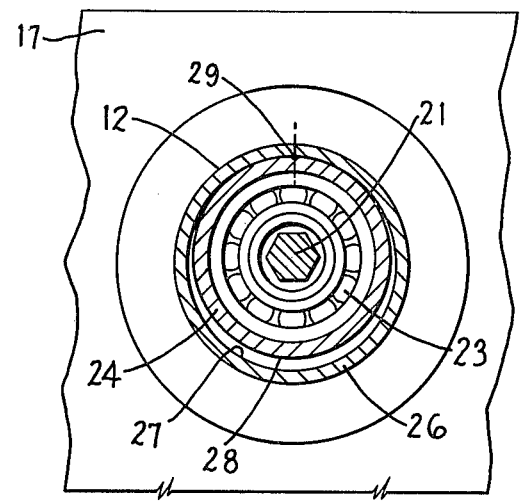

The roller unit 12, as illustrated in FIGS. 2-4, includes an elongated stationary support axle 21 which extends perpendicularly between the side rails 16 and 17, the ends of said axle 21 projecting through openings 22 in the side rails. A pair of conventional roller bearings 23 are located adjacent the opposite ends of the axle, and the outer races of these bearings 23 are suitably secured, as by a press fit, within the ends of an elongated tubular support shaft 24. This support shaft 24 extends across the full exposed width of the conveyor and in turn is surrounded by an elongated conveyor roll or sleeve 26.

The conveyor sleeve 26, as illustrated in FIGS. 3 and 4, has an inner diameter which is at least slightly greater than the outer diameter of the support shaft 24 so that the conveyor sleeve 26 is thus maintained in an eccentric relationship relative to the support shaft 24. In this regard, the conveyor sleeve 26 has an inner annular surface 27 which is adapted to rollingly and slippingly engage the outer annular surface 28 of the support shaft 24. The conveyor sleeve 26 is freely supported solely by the support shaft 24 which, due to the difference in diameters, results in the conveyor sleeve 26 being eccentrically positioned relative to the support shaft 24. The inner annular surface 27 thus effectively engages the outer annular surface 28 along a narrow contact area 29 which extends axially along the upper surface of the shaft 24 and effectively approaches a line.

Each end of the conveyor sleeve 26 preferably has a pair of sheet metal slinger plates 31 press fit thereon and projecting radially outwardly thereof, which plates act as diverters for oil, chips and other contaminating materials to prevent their coming into contact with the bearings 23. A hardened wear plate 32 is disposed adjacent each end of the roller unit, which wear plate is nonrotatably held relative to the adjacent side rail to prevent the ends of the roller unit from rotatably rubbing against and hence excessively wearing the side rail.

To cause rotational driving of the roller units 12, the drive system 13 includes a power transmitting drive train which is positively drivingly connected to at least selected roller units. As illustrated in FIG. 1, one end of the support shaft 24 as associated with each roller unit 12 has a pair of sprockets 36 and 37 fixedly and nonrotatably secured thereto in side-by-side relationship. A suitable drive chain 38 is engaged with and extends between the sprockets 36 of one adjacent pair of roller units 12, and a further drive chain 39 is engaged with the sprockets 37 on the next adjacent pair of roller units 12 is thereby permit transmission of driving torque along the conveyor to effectively positively rotatably drive the support shaft 24 as associated with each roller unit 12. The drive train 13 is connected to and driven by a single power source (not shown), such as an electric motor, whereby the drive train 13 causes rotational driving of all of the support or drive shafts 24 as positioned throughout the length of the conveyor. This drive train 13, in addition to causing positive nonslip driving of the shafts 24, is free of clutches and the like to permit continuous rotation of the shafts 24 associated with all of the powered roller units 12.

If necessary, each adjacent roller unit can be rotatably driven, in which case each roller unit would be formed identical to the unit 12 and would have a pair of said sprockets 36 and 37 associated therewith. However, it is preferred to drive only selected roller units located at predetermined intervals along the conveyor. For example, as illustrated in FIG. 1, the powered roller units 12 comprise each third roller unit along the conveyor, and a further pair of nonpowered roller units 12' are located between each pair of powered roller units 12. These nonpowered roller units 12' are identical to the powered roller units 12 except that they are not provided with the sprockets 36 and 37 thereon. By suitably driving only selected roller units located at preselected intervals along the conveyor, the driving torque is minimized.

Figure 5:
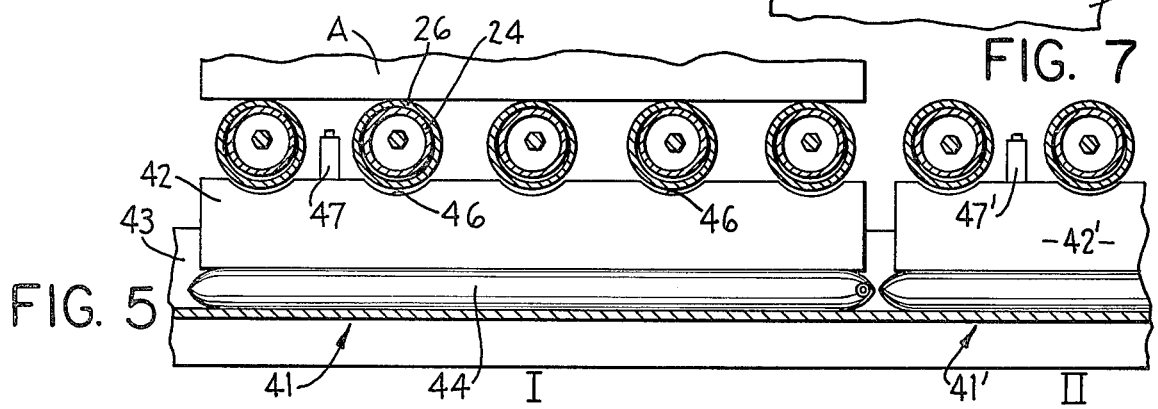
FIGS. 5 and 6 are fragmentary side elevational views diagrammatically illustrating the lifting device in the lowered and raised positions, respectively.
Figure 6:
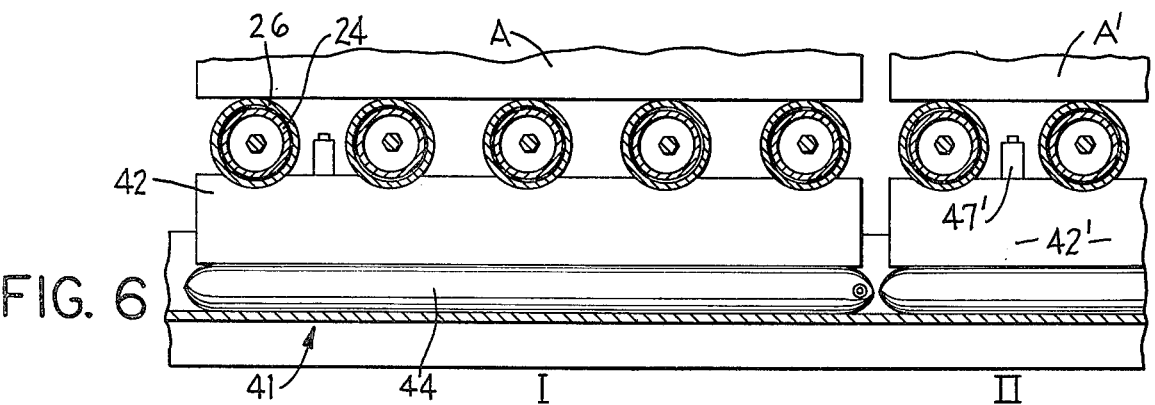

The conveyor 10, as illustrated in FIGS. 1, 5 and 6, possesses at least two article-stoppage zones I and II spaced longitudinally of the conveyor, which zones each have a brake or lift mechanism associated therewith for drivingly disengaging the conveyor sleeves 26 associated with the respective zone.

The lift mechanism 41 of zone I, and its identical counterpart 41' in zone II, includes an elongated lift member 42 which is disposed below the conveyor roller units and extends longitudinally throughout the selected zone in substantially perpendicular relationship to the individual roller units. The lift bar 42 is vertically movably supported within and guided by an elongated stationary guide channel 43, the lift bar being supported on and vertically actuated by a lifting device 44. This latter device, in the illustrated embodiment, comprises an elongated inflatable hose which extends throughout the zone and is connected to a suitable source of pressurized air so as to be selectively inflated or at least partially deflated as desired.

The upper edge of the lift bar 42 has suitable recesses or similar notches 46 positioned for seatingly engaging the conveyor sleeves 26 when the lift mechanism is actuated. These recesses 46 preferably have a configuration so as to effectively result in recentering of the sleeves 26 relative to the support axle 21, at least in the longitudinal direction of the conveyor, when the lift bar is raised upwardly for engaging the sleeves. For this purpose, the recesses 46 are illustrated as being arcuate, approaching a semicircle formed on a radius similar to the outer diameter of the sleeves 26, although it will be recognized that other configurations such as a shallow V-shaped notch would accomplish the same purpose.

In the illustrated embodiment, the lift mechanism 41 includes identical mechanisms disposed adjacent opposite sides of the conveyor for causing substantially simultaneous engagement of the conveyor sleeves 26 adjacent the opposite ends thereof. However, it will be recognized that in many instances a single lift mechanism may be sufficient. Further, the actuating device 44 may assume many other forms, such as conventional pneumatically inflatable cushions or similar devices.

The lift mechanism 41 may be either manually or automatically actuated, the latter being the normal and preferred approach. For this purpose, each zone is preferably provided with a sensor 47 for sensing the presence of an article A within the zone so as to thereby cause activation and hence lifting of the lift member 42. The sensor 47 may assume any of many conventional configurations, same being illustrated as a conventional photocell located adjacent the downstream end of the zone such that, when an article substantially occupies the zone, the light beam is interrupted so that an appropriate signal is emitted which, through appropriate conventional circuitry, causes activation of the lift mechanism 41 to thereby move the lift bar 42 upwardly into engagement with the sleeves 26.

While the use of a photocell is illustrated, the sensor may also be formed as a conventional spring-urged roller positioned for engagement with an article as it moves into the zone, the use of such roller sensors also being conventional.

OPERATION

The operation of a conveyor according to the present invention will be briefly described to insure a complete understanding thereof.

Figure 7:
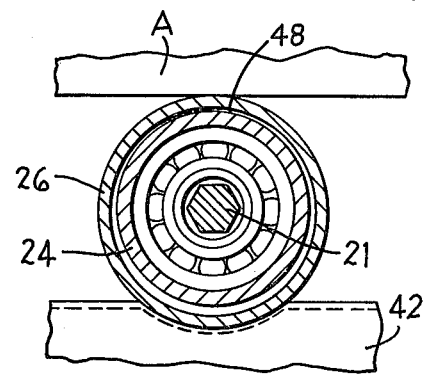
FIG. 7 is a fragmentary enlargement of a portion of FIG. 6.

During normal operation, the drive motor (not shown) is continuously energized so that, through the drive train 13, all of the drive shafts 24 as located in parallel spaced relationship longitudinally throughout the conveyor are continuously and positively driven. This in turn results in frictional driving of the conveyor sleeves or rolls 26 which are eccentrically positioned and supported on the drive shafts 24, whereby an article A is thus conveyed along the conveyor, such as in the direction indicated by arrow 49 in FIG. 1. When the article A reaches a selected zone, such as the zone I which may comprise a work station, the presence of article A is sensed by the sensor 47 which emits a control signal so as to cause activation of the lift mechanism 41 associated with zone I. The hoses 43, which are normally maintained in a partially inflated state, are then more fully inflated so that lift bars 42 are moved upwardly initially to engage the conveyor sleeves 26 within the zone I, and are then lifted upwardly an additional amount so that the sleeves 26 and the article A are lifted upwardly a small distance sufficient to result in the sleeves 26 being frictionally drivingly disengaged from the continuously driven drive shafts 24, resulting in a small clearance 48 therebetween as indicated in FIG. 7. This results in stoppage of the sleeves 26 associated with zone I, whereupon the article A is held stationary at this selected zone or work station. If a work station, then suitable operative or manual manipulations or work steps can be carried out on the article A as required or desired, following which lift device 41 is de-energized to lower the lift bar 42, whereupon article A is then again drivingly moved downstream of the conveyor.

While use of a photocell or other automatic sensor is illustrated for controlling the lift mechanism of zone I, it will be appreciated that the lift mechanism could also be manually controlled by an operator if desired.

With the article A stopped within zone I, whereupon the sensor 47 of zone I senses the continued presence of the article A, this also causes transmission of a suitable signal to the circuitry which controls the sensor 47' associated with the next upstream zone II so that this upstream sensor can also be activated in the event that another article is conveyed along the conveyor. For example, if the next article A' moves onto the sleeves 26 of zone II, and the article A is still stopped within the zone I, then sensor 47' will cause activation of the lift mechanism 41' so that article A' and the conveyor sleeves engaged therewith will also be lifted upwardly so as to stop same, whereby the article A' will be positioned adjacent but spaced from the article A so as to effectively result in zero accumulation pressure between adjacent stopped articles. As soon as article A is conveyed away from the zone I, then lift mechanism 41' will be de-energized so that article A' can then be conveyed forwardly into and stopped within the zone I.

Any desired number of zones, as briefly described above, can be located longitudinally in series so as to permit the stoppage and intermittent advancement of articles, as desired, whereby the articles can be advanced and yet stored in close positional relationship along the conveyor, while effectively resulting in zero accumulation pressure between adjacent articles. This is accomplished primarily by insuring that each zone is sized so as to stop and lift only a single article.

In some situations, the conveyor will be provided with only a single lift mechanism associated with a selected area thereof, such as a single zone I, which area may be used for defining a work station or the like. The region of the conveyor located upstream of this zone or work station could be formed as an accumulating-type conveyor formed preferably in the manner taught in co-pending application Ser. No. 63,045, the disclosure of which is incorporated herein by reference. In this manner, the region of the conveyor upstream of the work station would have a stop or other suitable device for holding the articles and permitting them to accumulate in series on the conveyor, with the articles than being individually discharged and fed into the work station or lifting zone so as to permit handling and/or treatment thereof as desired.

While the invention as disclosed utilizes pneumatic devices for controlling the lift mechanisms, it will be recognized that the lift devices may assume many other forms if desired. Pneumatic devices, however, are preferred since pneumatic components are conventionally and frequently utilized on or in association with conveyors due to the available supply of pressurized air which is normally readily available in environments of this type, and due also to the simplicity and dependability of the control systems associated with such arrangements.

In the conveyor of this invention, the conveyor sleeves 26 preferably have an inside diameter which is only slightly greater than the outside diameter of the drive shafts 24, this difference in diameter preferably being in the range of 1/16 inch to ½ inch, with the shaft 24 and sleeve 26 normally being in the range of between 2½ inches and 4 inches in diameter. In addition, the upward displacement of the conveyor sleeves 26 by the lifting mechanism is also preferably maintained extremely small, preferably approximately 1/16 inch. In fact, the actual upward displacement of the sleeves 26 can closely approach zero inasmuch as the critical limitation is the relieving of the normal pressure between the sleeve 26 and drive shaft 24 so as to prevent frictional driving of the sleeve from the drive shaft, which relief of normal pressure can be accomplished without effecting any significant or actual vertical lifting of the sleeve.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a powered roller conveyor for transporting articles, said conveyor including a frame, a plurality of roller units supported on said frame for defining a transport path for said articles, said roller unit including an elongated support shaft and an elongated sleevelike conveyor ring freely rotatably supported on said support shaft in surrounding relationship thereto, said conveyor ring having an inside diameter which is at least slightly greater than the outer diameter of said support shaft so that said ring is eccentrically supported on said shaft, said ring having an inner annular surface which is normally in rolling engagement with the outer annular surface of said shaft and is frictionally driven by and slidable upon said shaft, and drive means interconnected to the shafts associated with at least some of said roller units for continuously rotatably driving said shafts to thereby effect frictional rotational driving of the respective conveyor rings, the improvement comprising lift means associated with a selected number of said roller units for causing the associated conveyor rings to be stopped by interrupting the frictional driving engagement thereof with the continuously driven support shafts, said lift means including lifting member means mounted for limited vertical displacement to effect limited vertical lifting of the conveyor rings relative to the support shafts, and actuating means coacting with said lifting member means for causing the vertical displacement thereof.

2. A conveyor according to claim 1, wherein said drive means includes a single power source and a drive train drivingly connected between said power source and all of the driven support shafts associated with said conveyor for effecting continuous rotation of said driven support shafts, said drive train being free of clutches and other disengaging structure as associated with each driven support shaft so that each driven support shaft is continuously driven in a nonslip manner.

3. In a powered roller conveyor for transporting heavy loads or articles, said conveyor including a frame, a plurality of roller units supported on said frame for defining a transport path for said articles, said roller unit including an elongated support shaft and an elongated sleevelike conveyor ring which is solely supported by said support shaft in freely rotatably surrounding relationship thereto, said conveyor ring having an inside diameter which is at least slightly greater than the outer diameter of said support shaft so that said ring is throughout its entire axial length eccentrically supported relative to and on said shaft, said ring having an inner annular surface which is normally in rolling engagement with the outer annular surface of said shaft and is solely frictionally driven by and slidable upon said shaft, and drive means interconnected to the shafts associated with at least some of said roller units for continuously rotatably driving said shafts to thereby effect frictional rotational driving of the respective conveyor rings, the improvement comprising lift means associated with a selected number of said roller units for causing the associated conveyor rings to be stopped by interrupting the frictional driving engagement thereof with the continuously driven support shafts, said lift means including lifting member means mounted for limited vertical displacement to engage and effect limited vertical lifting of the conveyor rings relative to the support shafts so that the conveyor rings are lifted upwardly in their entirety into a raised position wherein they are maintained out of engagement with said shafts, and actuating means coacting with said lifting member means for causing the vertical displacement thereof.

4. A conveyor according to claim 3, wherein the conveyor ring is supported solely by its respective support shaft in an eccentric position relative thereto throughout its length due to the inner annular surface of the conveyor ring being supportingly and frictionally engaged with the outer annular surface of the respective support shaft along a narrow contact area which extends axially along the upper surface of the respective support shaft throughout substantially the full axial length of the conveyor ring, and wherein the lifting member means includes a pair of elongated lifting members positioned below the roller units and extending in the longitudinal direction of said conveyor, said pair of elongated lifting members being positioned in substantially parallel relationship and disposed adjacent the opposite axial ends of the conveyor rings, and said actuating means causing simultaneous vertical displacement of said elongated lifting members so that the latter engage said conveyor rings adjacent the opposite axial ends thereof and effect upward lifting of said rings in their entirety into a raised position wherein the rings are totally frictionally disengaged from and radially spaced relative to their respective support shafts, said conveyor rings when in said raised position being radially spaced throughout their circumferential and axial extent from the respective support shafts so that an elongated annular clearance space exists therebetween.

5. A conveyor according to claim 3 or claim 4, wherein the lifting member means has ring engaging means associated therewith which effectively engages and substantially recenters the individual conveyor rings when the latter are displaced upwardly into their raised positions so that the ring engaging means thus maintains the individual rings totally spaced and disengaged from the respective support shafts when in said raised position.

6. A conveyor according to claim 3, wherein the inner diameter of the conveyor ring is between 1/16 and ⅛ inch larger than the outer diameter of the support shaft, and wherein the lift means effects a vertical displacement of the conveyor rings through a maximum distance of approximately ⅛ inch so as to frictionally disengage the rings from the driving support shafts.

7. A conveyor according to claim 3, wherein the lifting member means is disposed below said roller units and extends longitudinally of the conveyor so as to be substantially simultaneously engageable with said selected number of conveyor rings, said lifting member means defining a plurality of longitudinally spaced apertures each defined by ring engaging means which effectively engages and substantially recenters the individual conveyor rings when the lifting member means is displaced upwardly into engaging relationship with the conveyor rings.

8. A conveyor according to claim 7, wherein said lifting member means comprises a pair of elongated and parallel raillike members disposed below said roller units and extending in the longitudinal direction of said conveyor, said pair of raillike members being positioned so as to engage and lift the conveyor rings adjacent the opposite axial ends thereof, and said raillike members having said spaced apertures formed in the upper surfaces thereof for seatingly engaging therein the individual conveyor rings.

9. In a powered roller conveyor for transporting and accumulating heavy loads or articles, said conveyor comprising:

a frame including a pair of elongated and substantially spaced side frame elements extending in substantially parallel relationship;

a plurality of roller units supported on said frame for defining a transport path for said loads or articles, said roller units extending horizontally between and being supported by said side frame elements;

said roller unit including an elongated support axle extending horizontally between said side frame elements, said support axle having the opposite ends thereof stationarily supported on said side frame elements for maintaining said support axle in a nonrotatable condition;

said roller unit also including an elongated support shaft formed as an axially elongated tube having an inner diameter which is substantially greater than the cross section of said support axle, the opposite axial ends of said support tube being positioned adjacent to but spaced from the respective side frame elements so as to be freely rotatable relative thereto, and antifriction bearing means coacting between said tube and the repective support axle adjacent the opposite axial ends of the tube for freely rotatably supporting said tube relative to its respective support axle;

drive means interconnected to the support shafts associated with at least some of said roller units for continuously rotatably driving said shafts, said drive means including an annular drive element fixedly secured to the driven support shafts adjacent one axial end thereof in the vicinity of the adjacent side frame element;

said roller unit including an axially elongated conveyor ring positioned in surrounding relationship to the respective support shaft, said conveyor ring being engaged and supported solely by the respective support shaft and being freely rotatable relative thereto, the conveyor ring having an inner annular surface means with an inside diameter which is at least slightly greater than the outer diameter of outer annular surface means defined on said support shaft so that said conveyor ring is throughout its entire axial length eccentrically supported relative to and on said support shaft, said inner annular surface means including inner annular areas located adjacent the opposite axial ends of the conveyor ring which are disposed in frictional engagement with outer annular surface areas which are directly fixedly related to the support shaft, the frictional contact between said inner and outer annular surface areas defining axially elongated narrow contact areas between said conveyor ring and said support shaft in the vicinity of the upper surface of the support shaft, whereby the conveyor rings are solely frictionally rotationally driven from the continuously rotatably driven support shafts; and lifting means associated with a selected number of said roller units for causing the associated conveyor rings to be lifted upwardly into a raised position wherein they are wholly disengaged from the respective support shafts so as to interrupt the frictional driving engagement between the conveyor rings and the continuously driven support shafts, said lifting means including a lifting member disposed below and normally maintained out of engagement with said conveyor rings, and actuating means for raising the lifting member upwardly into engagement with the conveyor rings and for effecting further lifting thereof so that the conveyor rings are lifted into said raised position wherein they are disengaged from the respective support shafts;

said lifting means also including centering means associated with the lifting member for maintaining the individual conveyor rings centered relative to the respective support shafts when the conveyor rings are in said raised position.

10. A conveyor according to claim 9, wherein an annular slinger ring is fixed to each said conveyor ring adjacent each axial free end thereof, and said frame means including a cover plate fixed to each said side frame element and projecting inwardly therefrom so as to overlie and partially enclose the adjacent slinger plates.

* * * * *